United States Patent [19]

Higuchi

[11] 4,178,713

[45] Dec. 18, 1979

[54] FISHING ROD MADE OF FIBER REINFORCED SYNTHETIC RESIN

[76] Inventor: Kenichi Higuchi, No. 2-17, 7-chome, Shinimazato, Ikuno-ku, Osaka-shi, Osaka-fu, Japan

[21] Appl. No.: 842,871

[22] Filed: Oct. 17, 1977

[51] Int. Cl.$^2$ .............................................. A01K 87/00
[52] U.S. Cl. .................................... 43/18 GF; 428/35
[58] Field of Search ................ 43/18 GF; 428/35, 36, 428/251, 365

[56] References Cited

U.S. PATENT DOCUMENTS

| | | |
|---|---|---|
| 2,749,643 | 6/1956 | Scott ................................. 43/18 GF |
| 3,421,247 | 1/1969 | Hubbard ............................ 43/18 GF |
| 4,025,675 | 5/1977 | Jonda ...................................... 428/36 |
| 4,061,806 | 12/1977 | Lindler et al. ................ 43/18 GF X |

*Primary Examiner*—James G. Smith
*Attorney, Agent, or Firm*—Cantor and Singer

[57] ABSTRACT

A fishing rod comprising a plurality of fiber reinforced synthetic resin laminations and a specific space retaining layer provided intermediate the outermost layer and the innermost layer thereof. Due to the provision of this space retaining layer, a distortion due to a bending moment is effectively reduced and the fishing rod can enjoy light weight and high stiffness.

5 Claims, 4 Drawing Figures

FISHING ROD MADE OF FIBER REINFORCED SYNTHETIC RESIN

This invention relates to a fishing rod made of a synthetic resin and more particularly to an improvement in a fishing rod of a fiber reinforced synthetic resin.

Heretofore there have been provided various fishing rods made of fiber reinforced synthetic resins. These conventional fishing rods are generally manufactured in such a manner that resin impregnated cloth is closely or snugly wound around a tapered mandrel reducing its diameter from one end to the other end to form one or more layers, the resin is subjected to curing and then the mandrel is withdrawn to take off the tubular product. When an external force is applied to and a bending moment acts on the thus manufactured conventional fishing rod, it will be seen that the section of the fishing rod can remain round keeping a section modulus of an annular pipe as long as the distortion or deflection of the fishing rod is relatively small, but the section is deformed from round to substantially elliptical as shown in FIG. 3 reducing the section modulus as the external bending force gets larger and the destortion of the fishing rod becomes more serious. Further, according to the deformation of the section, a tensile stress is set up in the tangential direction and slitting may possibly be caused in the fishing rod. To solve the problem there have been proposed to provide an additional layer formed of cloth whose fibers are disposed not in paralled with the length of the fishing rod but at an angle therewith or to provide an extra layer of cloth whose wefts are particularly reinforced. This proposal, however, is not desirable because the provision of such an additional or extra layer disadvantageously brings about increase in weight of the fishing rod.

Upon extensive and intensive studies, the inventor of the present invention has found that a specific space retaining layer incorporated in a laminate comprising a fishing rod can effectively eliminate the problems of the conventional fishing rods and achieved an improved structure of a fishing rod.

It is therefore an object of the present invention to provide a fishing rod free from the drawbacks of the conventional fishing rods, light in weight and excellent in performance.

According to the present invention, there is provided a fishing rod comprising a plurality of layers made of fiber reinforced synthetic resin, characterized by a space retaining layer provided intermediate the innermost and the outermost layers.

The invention will be better understood from the following description taken in connection with the accompanying drawings in which.

Figure 1:
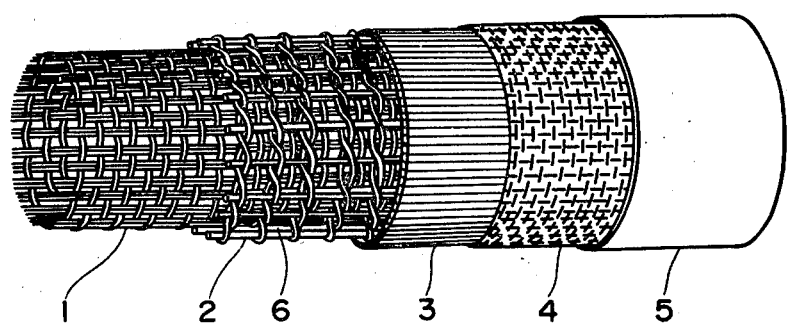
FIG. 1 is a fragmentary cut-away perspective view of a laminated structure of the fishing rod in accordance with the present invention.

Referring now to the drawings, there is illustrated one preferred embodiment of the present invention.

Figure 2:
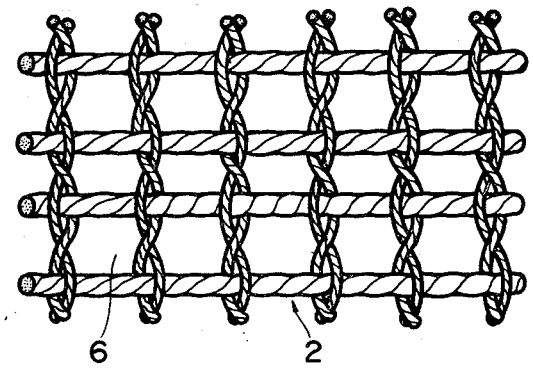
FIG. 2 is an enlarged fragmentary view of a space retaining layer to be incorporated in the fishing rod of the present invention.

In FIG. 1 which explanatorily shows one mode of a laminated structure of the present fishing rod, an innermost layer 1 is formed of a prepreg sheet comprising glass fiber cloth of plain weave or satin weave or cloth of "KEVLAR-49" (trade name of aromatic polyamide type fiber manufactured and sold by Du Pont Co., U.S.A.). For the innermost layer 1, union fabric of glass fibers and KEVLAR-49 may also be employed. A space retaining layer 2 is formed for example of resin impregnated woven cloth as shown in FIG. 2 which has relatively large interstices, large thickness and small weight per unit area. This layer 2 is thus characterized by spaces formed in the interstices of the woven cloth. Similar fibers as employable for the innermost layer 1 may also be employed for this layer 2. On the outside of the space retaining layer 2, there is formed a reinforcing fiber layer 3 in which the fibers are arranged or oriented in the direction parallel to the length of the rod pipe. The fibers to be employed for this layer 3 may be advantageously selected from a class of materials having a high tensile strength and high modulus. As suitable examples of the fibers, there can be mentioned resin impregnated fibers available under the indication of "KEVLAR-49", carbon filaments, or a mixture thereof.

An outermost layer 4 is formed of a prepreg sheet with a fabric base of plain weave or other weave made of one of the above-mentioned materials or union fabric thereof.

Generally, the laminate structure is formed by winding the respective sheets around the tapered mandrel in the sequence as mentioned above the whole structure is subjected to curing to set the resin. Thus, there is obtained a fishing rod of the present invention in which the space retaining layer 2 having a number of spaces therein is integrally formed.

Numeral 5 designates a painted surface of the fishing rod.

Figure 3:
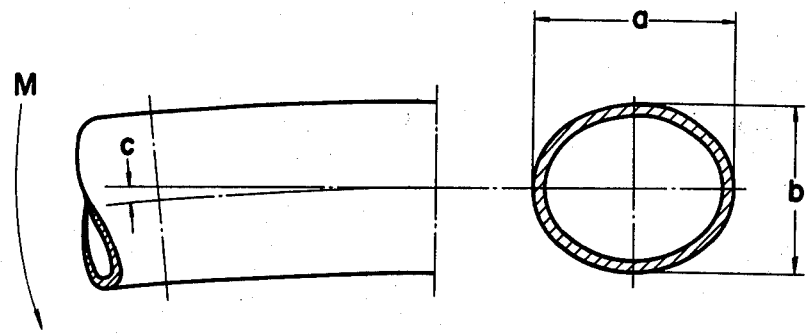
FIG. 3 is a diagrammatic view showing a fragmentary pipe of the conventional fishing rod with a bending moment acting thereon.
Figure 4:
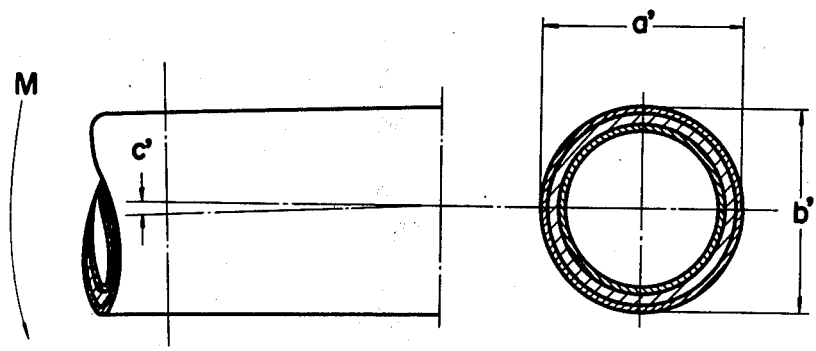
FIG. 4 is a similar diagrammatic view showing a fragmentary pipe of the present fishing rod with a bending moment acting thereon.

Due to the thus formed structure, the fishing rod of the present invention can increase its bulk in proportion to the spaces provided therein and can increase its wall thickness as compared with a conventional fishing rod of the same weight. Among other things, it is the most important that no significant deformation of the section is caused and the section is kept round in contrast with the conventional fishing rod as shown in FIG. 3 when a bending moment M acts on the pipes. Illustratively stated, deformation rate of section: $a'/b' < a/b$ distortion due to bending: $c' < c$.

Thus, the present invention can reduce the distortion due to bending moment and provide an excellent fishing rod having a light weight and high stiffness.

The invention has been described referring to one preferred embodiment but the description is made only by way of example and not intended in any way to limit the invention. For example, the number of the laminations or the materials of the resins may be arbitrarily selected according to necessity. In case the number of the laminations are increased, the space retaining layer 2 may be provided at an appropriate position between the innermost and outermost layers. Further, more than one space retaining layers may be provided.

In brief, it is essential and sufficient in the present invention to form a space retaining layer at an intermediate position of the laminate structure. The means forming spaces in the space retaining layer is not limited to the embodiment as shown in FIG. 2 but may be provided by a woven cloth of other weave or other materials such as a net, perforated sheet or honeycomb structure, etc.

I claim:

1. A tubular fishing rod having a circular cross-section and comprising an inner layer formed of a woven cloth; a space retaining layer formed of woven cloth which has relatively large interstices, large thickness and small weight per unit area over said inner layer; an intermediate layer formed of fibers longitudinally unidirectionally oriented over said space retaining layer; an outermost layer formed of a woven cloth; and a cured synthetic resin binding the cloth and fibers to form a unitary solid mass.

2. A fishing rod as claimed in claim 1, wherein said space retaining layer has spaces in the interstices of the woven cloth.

3. A fishing rod as claimed in claim 1, wherein said space retaining layer is made of a resin impregnated netting.

4. A fishing rod as claimed in claim 1, wherein said space retaining layer is made of a resin impregnated perforated sheet.

5. A fishing rod as claimed in claim 1, wherein said space retaining layer is made of material having a honeycomb structure and impregnated with a resin.

* * * * *